(No Model.)

H. J. SIMON.
COUPLING FOR WAGON TIRES.

No. 343,736. Patented June 15, 1886.

Witnesses

Inventor
Henry J. Simon
By his Attorneys

UNITED STATES PATENT OFFICE.

HENRY JOSEPH SIMON, OF INERO, TEXAS.

COUPLING FOR WAGON-TIRES.

SPECIFICATION forming part of Letters Patent No. 343,736, dated June 15, 1886.

Application filed March 27, 1886. Serial No. 196,829. (No model.)

*To all whom it may concern:*

Be it known that I, HENRY JOSEPH SIMON, a citizen of the United States, residing at Inero, in the county of De Witt and State of Texas, have invented a new and useful Improvement in Couplings for Tires, of which the following is a specification, reference being had to the accompanying drawings.

My invention relates to improvements in tire-tighteners; and it consists of the peculiar and novel construction and combination of parts, substantially as hereinafter fully set forth, and particularly pointed out in the claims.

The object of my invention is to provide an improved tire-tightener which can be applied to any class of vehicle-wheel with ease and rapidity, and which will avoid the necessity for reheating the tire and removing it from the wheel; to provide means which can be very easily and quickly adjusted to bring the ends of the tire together when the tire is contracted and the ends thereof are separated, and to provide improved means which shall be very simple, strong, and durable in construction, thoroughly effective in operation, easy and ready of adjustment, and cheap and inexpensive of manufacture.

Figure 1:
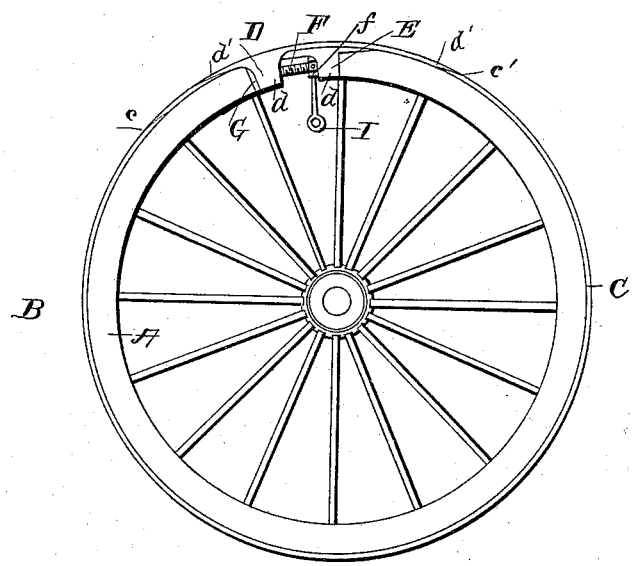
Figure 2:
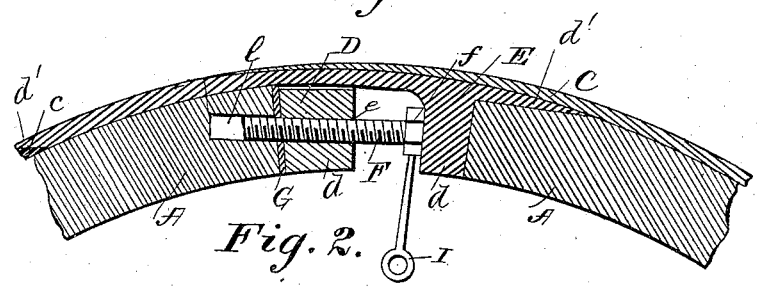
Figure 3:
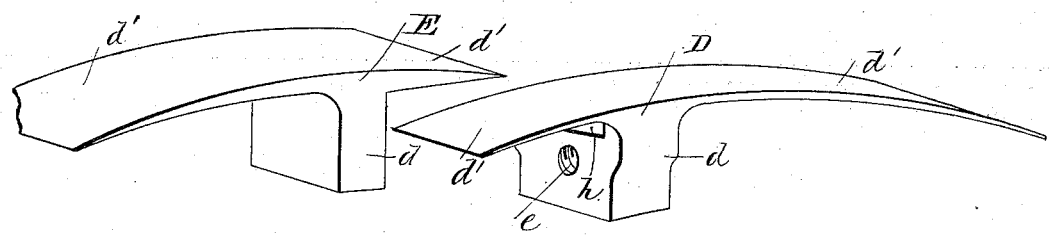

In the accompanying drawings, Figure 1 is a side elevation of wheel having my improved tire-tightener applied thereto. Fig. 2 is a vertical longitudinal sectional view through a portion of the wheel and my improved tire-tightener. Fig. 3 is a detached perspective view in detail of my invention.

Referring to the drawings, in which like letters of reference denote corresponding parts in all the figures, A designates the fellies of the wheel B, and C the ordinary form of tire thereon, the ends $c$ $c'$ of which are separated for a short distance, as are also the ends of the fellies A.

D E designate the sections of my improved tire-tightener, which are each provided with an integral depending lug, $d$, at or near their middle, and on the lower face thereof, so as to provide two plates, $d'$, each of the plates of the tire-tightener sections being tapered toward their free ends. One of the integral depending lugs of the tire-tightener sections is provided with a transverse opening, $e$, which is interiorly threaded, and in this threaded opening works a threaded adjusting-bolt, F, which is provided at one end with an enlarged head, $f$, that bears against one of the adjacent faces of the depending lug of the other tire-tightener section. The section D carries the adjusting-bolt F, and the bolt is adapted to bear against the lug of the other section, E, of the tire-tightener.

G designates a vertically-disposed plate, that is interposed between the lug of the section D and the end of the felly A adjacent thereto, and this plate G is also provided with a threaded opening for the free end of the adjusting-bolt.

In applying my improved tire-tightener to a wheel one of the sections D or E thereof is secured to one end of the tire B. As shown herein the section D is secured to the end $c$ of the tire B, and the section E is secured to the end $c'$ of the tire. In order to very firmly and rigidly connect or secure the parts or sections of the tightener to the ends of the tire one of the beveled ends of the plates $d$ of the sections D E is heated and welded to the ends of the tire, and the free end of the section E is passed through an opening or slot, $h$, in the lug of the section D, so that the section D will overlap the section E, and the lugs of the sections will be arranged on the same plane and parallel with each other. The adjacent ends of the fellies that lie beneath the lapped ends of tire-tightener sections are cut away to permit the lugs thereof to fit or lie between them, and the upper or outer edges of the fellies are inclined or beveled to receive the welded ends of the tire-tightener sections, as will be very readily understood. It will thus be seen that the lugs of the sections of the tire-tightener are arranged opposite to each other and parallel, and the plate G is interposed between the rear or inner face of the lug of the section D and the end of the felly adjacent thereto, after which the adjusting-bolt is fitted in place in the threaded opening in the lug of the section D and the plate G. The free threaded end of the adjusting-bolt is passed into an opening or socket, $l$, provided for its reception in the end of the felly in rear of the plate G, and the said plate bears against the edges of the opening $l$ and the end of the felly to prevent the latter from splitting under the strain that is brought thereon when the lugs of the tire-tightener sections are forced away from each to draw the lapped ends of the tire together. The threaded end of the adjusting-bolt thus works in the threaded openings of one of the lugs $d$ and of the protecting-plate G, and the headed end $f$ of said bolt bears against the solid lug $d$ of the section E; and when the bolt is turned in one direction it forces the lugs $d\ d$ away from each other and draws the lapped ends of the tire toward each other to tighten or take up the s'ack in the same, the reverse rotation of the bolt loosening the tire. When the tire is tightened, the threaded end of the adjusting-bolt is withdrawn from the socket $l$, or nearly so, and the head $f$ bears against the lug $d$ of the section E to prevent longitudinal movement of the adjusting-bolt. When the tire becomes loose and the adjusting bolt turns in its bearings, it is only necessary to rotate the same in the proper direction to draw the ends of the tire together, which can be very easily and readily performed by an implement of any suitable character.

I have shown herein a pointed bolt or pin, I, that is adapted to be fitted at one end in an opening in the head of the adjusting-bolt; but it will be understood that I do not confine myself to this particular form of implement.

From the foregoing description it will be observed that I provide an improved tire-tightener which can be very easily and readily secured to the tire of either old or new wheels and of any class, to adapt them to be adjusted to the required degree at all times; that the device is very simple and strong in its construction, and cheap and inexpensive of manufacture. By welding the ends of the tire-tightener sections onto the end of the tire, and thus practically forming said parts integral with each other, the device is greatly strengthened and rendered more durable, and by overlapping the meeting ends of the sections D E and passing one of them through the other the parts are very compactly disposed, so that they take up but a very small space, and also brace or strengthen each other, any lateral movement of the tightener-sections D E being prevented by passing one of them through the other.

I do not desire to confine myself to the exact details of construction and form and proportion of parts herein shown and described, as I am aware that changes therein can be made without departing from the principle of my invention.

Having thus fully described my invention, what I claim as new, and desire to secure by Letters Patent, is—

1. The combination, with the tire, of the sections D E, carried thereby and overlapping one another, each of the said sections having an integral lug, which are arranged in alignment with each other, and an adjusting-bolt carried by one of the lugs and bearing against the other lug to draw the ends of the tire together, substantially as described.

2. The combination, with the tire, of the sections D E, welded at one end to the meeting ends of the tire and overlapping one another, the free ends of the said sections having integral depending lugs that are arranged parallel with each other, one end of one of the sections being passed through one of the lugs, and an adjusting-bolt carried by one of the lugs and bearing against the other lug, substantially as described.

3. The combination, with the wheel-fellies, one of which has a longitudinal socket, $l$, of the overlapping sections D and E, secured to the contiguous ends of the tire, and having projecting lugs $d$, an adjusting-bolt carried by one of the lugs and bearing against the other lug, and a protecting-plate, G, having a threaded opening for the passage of the bolt and interposed between the end of the felly in which the socket $l$ is formed, and the lug $d$, adjacent thereto, substantially as described, for the purpose set forth.

In testimony that I claim the foregoing as my own I have hereto affixed my signature in presence of two witnesses.

HENRY JOSEPH SIMON.

Witnesses:
AUG. HOLZAPFEL,
B. SCHIWETZ.